Patented July 31, 1945

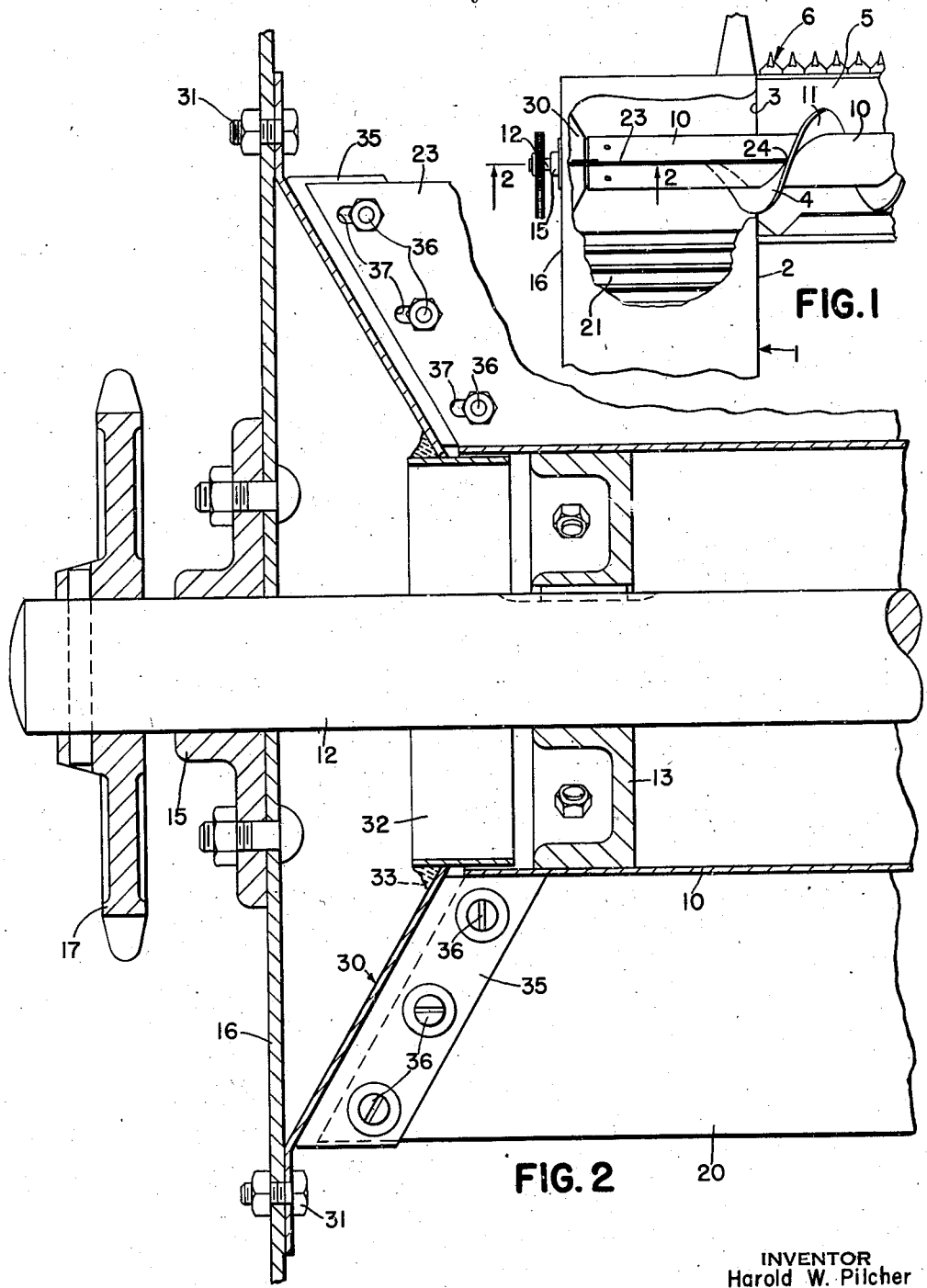

2,380,547

UNITED STATES PATENT OFFICE 2,380,547

COMBINE

Harold W. Pilcher, Rock Island, Ill., assignor to Deere & Company, Moline, Ill., a corporation of Illinois Application May 29, 1942, Serial No. 445,403

7 Claims. (Cl. 198—213)

My invention relates to combines and more particularly to that type of combine having an auger conveyor extending transversely in back of the cutting mechanism for conveying the cut crop to a feeder house from where it is conveyed rearwardly to a threshing cylinder. The object of my invention is to provide an improved arrangement to effect a smooth flow of crop in the feeder house, particularly at the delivery end of the auger conveyor, where the direction of travel makes a right angle turn.

In the combines of this type with which I am familiar, it is common to provide a disk or cone at the delivery end of the auger to prevent the crop from being packed against the closed end of the feeder house and to direct it outwardly towards the other conveying mechanism in the feeder house. I have found that a smoother flow of grain and change in direction thereof with less power expended is obtained by providing a fixed inwardly extending deflecting cone on the closed wall of the feeder house, in axial alignment with the auger conveyor, with the inner end of the flight or paddle on the auger conveyor extended into close or wiping contact with the surface of the cone. Preferably I provide a flexible wiper on the end of the paddle. I have found that there is a much greater tendency for the crop to flow outwardly upon being directed against the stationary cone, due to the movement of the crop relative to the stationary cone, than in the prior machines in which a disk or cone is fixed on the auger conveyor itself and rotates with it.

A preferred embodiment of my invention is disclosed in the following specification and illustrated in the accompanying drawing in which:

Fig. 1 is a fragmentary plan view of that part of a combine to which my invention relates, namely, the feeder house and the inner end of the auger conveyor, the top side of the feeder house being broken away for better illustration; and Fig. 2 is an enlarged vertical cross-sectional view through the axis of the auger conveyor, along the line 2—2 of Fig. 1.

Referring to the drawing, the feeder house comprises a forwardly extending enclosure 1, the grainward side 2 of which has an opening 3 through which cut crop is conveyed by an auger conveyor 4. The auger conveyor is disposed in a grain pan 5 extending laterally from the feeder house 1 in line with the opening 3. A cutting mechanism 6 extends along the forward edge of the grain pan 5.

The auger conveyor 4 comprises a tubular axle 10 to which is fixed a helicoid auger flight 11. Axle 10 is mounted on a shaft 12 through the intermediary of a series of spaced spiders 13, only the inner end one of which is shown. Shaft 12 extends beyond the ends of the tubular axle 10 and is journaled in a bearing on the grainward end of the grain pan, not shown, and in a bearing 15 mounted upon the stubbleward end wall 16 of the feeder house. A sprocket 17 is fixed to this end of the shaft 12 for rotating the auger conveyor.

At its delivery end, auger flight 11 terminates in a substantially straight paddle or blade 20, which extends into the feeder house and functions to direct the crop upon a rearwardly extending slat conveyor 21, which in turn delivers the crop to the threshing cylinder (not shown). Preferably a second paddle 23 is provided positioned diametrically opposite the paddle 20, the outer end intersecting the auger flight at 24.

On the inner side of the wall 16, a frustoconical deflecting member 30 is provided, the latter embracing the shaft 12 and disposed in axial alignment therewith. The base of the cone 30 is suitably fixed to the inner side of the wall 16 as by bolts 31. The small end of the cone 30 terminates in a short cylindrical band or ring 32 disposed coaxially of the shaft 12 and projecting a short distance into the tubular axle 10, being of slightly smaller diameter than the tubular axle, to be overlapped thereby. The ring 32 is preferably fixed to the end of the cone by welding as shown at 33.

The two paddles 20 and 23 extend inwardly to within a short distance of the outer surface of the cone 30, the ends thereof being at an angle corresponding to the angle of inclination of the cone. The ends of the paddles are provided with flexible wipers 35 having wiping engagement with the outer surface of the cone 30. Preferably they are fixed to the paddles by means of three bolts 36 passing through slots 37 in the ends of the paddles, whereby their position with respect to the cone may be adjusted.

As the cut crop is delivered into the feeder house 1 through the opening 3 by the rotating auger conveyor 4, it is received by the paddles 20 and 23 and directed upon the slat conveyor 21. In heavy crop when no cone 30 is provided, there is a tendency for the crop to be packed against the end wall 16 prior to being delivered to the slat conveyor, considerably increasing the power required to rotate the auger conveyor. Stop disks or cones have been provided upon the inner end of the auger conveyor itself to alleviate this trouble, but I have found that the provision of a stationary cone on the end wall of the feeder house gives the best results. The crop, coming in contact with the outwardly inclined surface, is urged outwardly by other crop coming in and by the action of the wipers, and this movement is augmented by the fact that the cone is stationary and not rotating with the paddles and the crop.

Having described my invention, what I claim as new and desire to Letters Patent is as follows:

I claim:

1. In a machine of the class described, a feeder house having an end wall, an auger conveyor extending into said feeder house and adapted to convey crop into said feeder house towards said end wall, a cone mounted in fixed position on said side wall in line with said auger and against which said auger delivers crop, said cone functioning to urge the crop delivered thereagainst radially outwardly of the auger, a blade mounted on the delivery end of said auger, and a wiper along the end of said blade and having wiping engagement with the surface of said cone.

2. In a machine of the class described, a feeder house having an end wall, an auger conveyor extending into said feeder house and adapted to convey crop into said feeder house towards said end wall, said auger conveyor comprising a tubular axle and an auger flight embracing the latter, a cone on said end wall in axial alignment with said auger conveyor and having a ring fixed to its apex extending into the inner end of said tubular axle to be overlapped thereby, said cone functioning to urge the crop delivered thereagainst radially outwardly of the auger conveyor.

3. In a conveyor comprising a trough having an end wall and an auger rotatably mounted in the trough and adapted to deliver material in the direction of said end wall, means for facilitating delivery of said material radially of said auger comprising a conical member fixed to said end wall and disposed generally coaxial of said auger, said auger having a blade terminating adjacent said conical member and sufficiently close thereto to engage material on the member and propel it radially outwardly.

4. In a conveyor comprising a trough having an end wall and an auger rotatably mounted in the trough and adapted to deliver material in the direction of said end wall, means for facilitating delivery of said material radially of said auger comprising a conical member having its base portion fixed to said end wall and an opening extending axially therethrough, said auger having a shaft extending through said axial opening and supported on said end wall and a blade mounted on said shaft and rotatable therewith, said blade terminating adjacent said conical member and sufficiently close thereto to sweep material from said conical member and propel the same radially outwardly.

5. In a conveyor comprising a trough having an end wall and an auger rotatably mounted in the trough and adapted to deliver material in the direction of said end wall, means for facilitating delivery of said material radially of said auger comprising a conical member having its base portion fixed to said end wall and disposed generally coaxial of said auger, said auger having a blade terminating adjacent said conical member, and a flexible element fixed to the end of said blade and positioned to wipe said conical member to propel material radially outwardly thereof.

6. In combination, a conveyor trough having an end wall, an auger rotatably mounted in the trough for delivering material in the direction of said end wall, said auger comprising a supporting shaft supported on said end wall, a hollow tubular member mounted coaxially on said shaft and a crop engaging blade mounted on said tubular member and rotatable therewith, and a deflecting member fixed to said end wall and having an inwardly tapering frusto-conical surface disposed coaxially with said shaft with the inner end of the deflecting member in lapped relation to said tubular member, said blade terminating adjacent said deflecting member and sufficiently close to said frusto-conical surface to sweep material therefrom and propel the material radially outwardly.

7. In combination, a conveyor trough having an end wall, an auger rotatably mounted in the trough for delivering material in the direction of said end wall, said auger comprising a supporting shaft supported on said end wall, a hollow tubular member mounted coaxially on said shaft and a crop engaging blade mounted on said tubular member and rotatable therewith, and a deflecting member fixed to said end wall and having an inwardly tapering frusto-conical portion disposed coaxially with said shaft and a cylindrical collar fixed to the inner end of said frusto-conical portion in lapped relation to said tubular member, said blade terminating adjacent said deflecting member and sufficiently close to said frusto-conical surface to sweep material therefrom and propel the material radially outwardly.

HAROLD W. PILCHER.